US011394926B2

(12) United States Patent
Yokota et al.

(10) Patent No.: US 11,394,926 B2
(45) Date of Patent: Jul. 19, 2022

(54) PERIPHERY MONITORING APPARATUS

(71) Applicant: DENSO CORPORATION, Kariya (JP)

(72) Inventors: Nobuyuki Yokota, Kariya (JP); Akihiro Sunasaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 585 days.

(21) Appl. No.: 16/323,359

(22) PCT Filed: Aug. 9, 2017

(86) PCT No.: PCT/JP2017/029004
§ 371 (c)(1),
(2) Date: Feb. 5, 2019

(87) PCT Pub. No.: WO2018/030491
PCT Pub. Date: Feb. 15, 2018

(65) Prior Publication Data
US 2021/0289169 A1    Sep. 16, 2021

(30) Foreign Application Priority Data
Aug. 12, 2016  (JP) .............................. JP2016-158753

(51) Int. Cl.
*H04N 7/18* (2006.01)
*B60R 1/00* (2022.01)
(Continued)

(52) U.S. Cl.
CPC ............ *H04N 7/181* (2013.01); *B60R 1/00* (2013.01); *G06V 20/58* (2022.01); *H04N 5/2628* (2013.01);
(Continued)

(58) Field of Classification Search
CPC ........ H04N 7/181; H04N 5/2628; H04N 7/18; G06K 9/00805; B60R 1/00;
(Continued)

(56) References Cited

U.S. PATENT DOCUMENTS 7,307,655 B1    12/2007  Okamoto et al.
2005/0275721 A1*  12/2005  Ishii ...................... H04N 7/188
                                                    348/159
(Continued)

FOREIGN PATENT DOCUMENTS

CN    203713784 U    7/2014
JP    3286306 B2    5/2002

*Primary Examiner* — Farzana Hossain
(74) *Attorney, Agent, or Firm* — Maschoff Brennan

(57) ABSTRACT

In a periphery monitoring apparatus, a display processing unit displays, in a display apparatus that is provided in a vehicle, a plurality of captured images that are acquired by a plurality of cameras provided in a plurality of differing positions in the vehicle and have overlapping portions in which portions of imaging areas overlap each other, such that the overlapping portions remain. A determining unit determines whether a predetermined target object to be detected is present in each of the plurality of captured images. The display processing unit includes an enlargement processing unit that enlarges at least one captured image in which the target object is determined to be present, among the plurality of captured images, and displays the captured image in the display apparatus when the determining unit determines that the target object is present in at least one of the plurality of captured images.

7 Claims, 5 Drawing Sheets

(51) Int. Cl.
*H04N 5/262* (2006.01)
*G06V 20/58* (2022.01)

(52) U.S. Cl.
CPC ... *B60R 2300/105* (2013.01); *B60R 2300/303* (2013.01); *B60R 2300/60* (2013.01)

(58) Field of Classification Search
CPC ........ B60R 2300/303; B60R 2300/105; B60R 2300/60; G06V 20/58; G08G 1/16
See application file for complete search history.

(56) References Cited

U.S. PATENT DOCUMENTS

| | | | |
|---|---|---|---|
| 2008/0077882 A1* | 3/2008 | Kramer | G06K 9/00832 |
| | | | 715/810 |
| 2014/0055616 A1 | 2/2014 | Corcoran et al. | |
| 2015/0191120 A1* | 7/2015 | Honda | B60Q 1/00 |
| | | | 348/148 |
| 2017/0368993 A1* | 12/2017 | Imura | G08G 1/16 |

* cited by examiner

PERIPHERY MONITORING APPARATUS

CROSS-REFERENCE TO RELATED APPLICATIONS

The present application is a national stage application of PCT Application No. PCT/JP2017/029004, filed on Aug. 9, 2017, which claims the benefit of priority based on Japanese Patent Application No. 2016-158753, filed on Aug. 12, 2016 to the Japan Patent Office, the descriptions of which are incorporated herein by reference.

TECHNICAL FIELD

The present disclosure relates to a periphery monitoring apparatus that is mounted in a vehicle.

BACKGROUND ART

PTL 1 discloses a periphery monitoring apparatus that displays, in a display apparatus that is provided in a vehicle, a plurality of captured images that are acquired by a plurality of cameras provided in a plurality of differing positions in the vehicle. The periphery monitoring apparatus combines the plurality of captured images that have overlapping portions in which portions of imaging areas overlap each other into a single image by overlapping the overlapping portions with reference to a plane, such as a road surface. The periphery monitoring apparatus then displays the combined image in the display apparatus.

CITATION LIST

Patent Literature

[PTL 1] Japanese Patent Publication No. 3286306

SUMMARY OF INVENTION

The above-described plurality of captured images are captured by the plurality of cameras provided in the plurality of differing positions in the vehicle. Therefore, display aspects of an object that has height, such as a person or a vehicle, in the overlapping portions of the captured images each differ. As a result of detailed examination by the inventors, an issue has been found in that, when an object that has height is present in the overlapping portion, a driver has difficultly viewing the object on a display screen, such as by portions of the object that should be displayed in the overlapping portion disappearing from the display screen. In addition, an issue has been found in that the size of the object that is displayed on the display screen is small and the driver does not easily notice the object.

An aspect of the present disclosure is to provide a periphery monitoring apparatus that is capable of suppressing difficulty, experienced by a driver, in viewing an object in a vehicle periphery on a display screen.

An embodiment of the present disclosure is a periphery monitoring apparatus that includes a display processing unit and a determining unit. The display processing unit displays in a display apparatus that is provided in a vehicle, a plurality of captured images that are acquired by a plurality of cameras provided in a plurality of differing positions in the vehicle and have overlapping portions in which portions of imaging areas overlap each other, such that the overlapping portions remain. The determining unit determines whether a predetermined target object to be detected is present in each of the plurality of captured images. In addition, the display processing unit includes an enlargement processing unit. The enlargement processing unit enlarges at least one captured image in which the target object is determined to be present, among the plurality of captured images, and displays the captured image in the display apparatus when the determining unit determines that the target object is present in at least one of the plurality of captured images.

As a result of a configuration such as this, each of the plurality of captured images are displayed in the display apparatus such that the overlapping portions of the captured images remain. Therefore, even when an object that has height is present in the overlapping portion of the captured images, it becomes more difficult for portions of the object to disappear from the display screen. As a result, difficulty experienced by the driver in viewing an object on the display screen can be suppressed. In addition, the captured image in which a target object is determined to be present is displayed in an enlarged manner. Therefore, reduction in size of the target object displayed on the display screen does not easily occur. As a result, a situation where the driver does not easily notice the target object on the display screen can be suppressed. Consequently, difficulty experience by the driver in viewing a target object in the own vehicle periphery on the display screen can be suppressed.

DESCRIPTION OF EMBODIMENTS

An exemplary embodiment of the present disclosure will hereinafter be described with reference to the drawings.

1. Configuration

Figure 1:
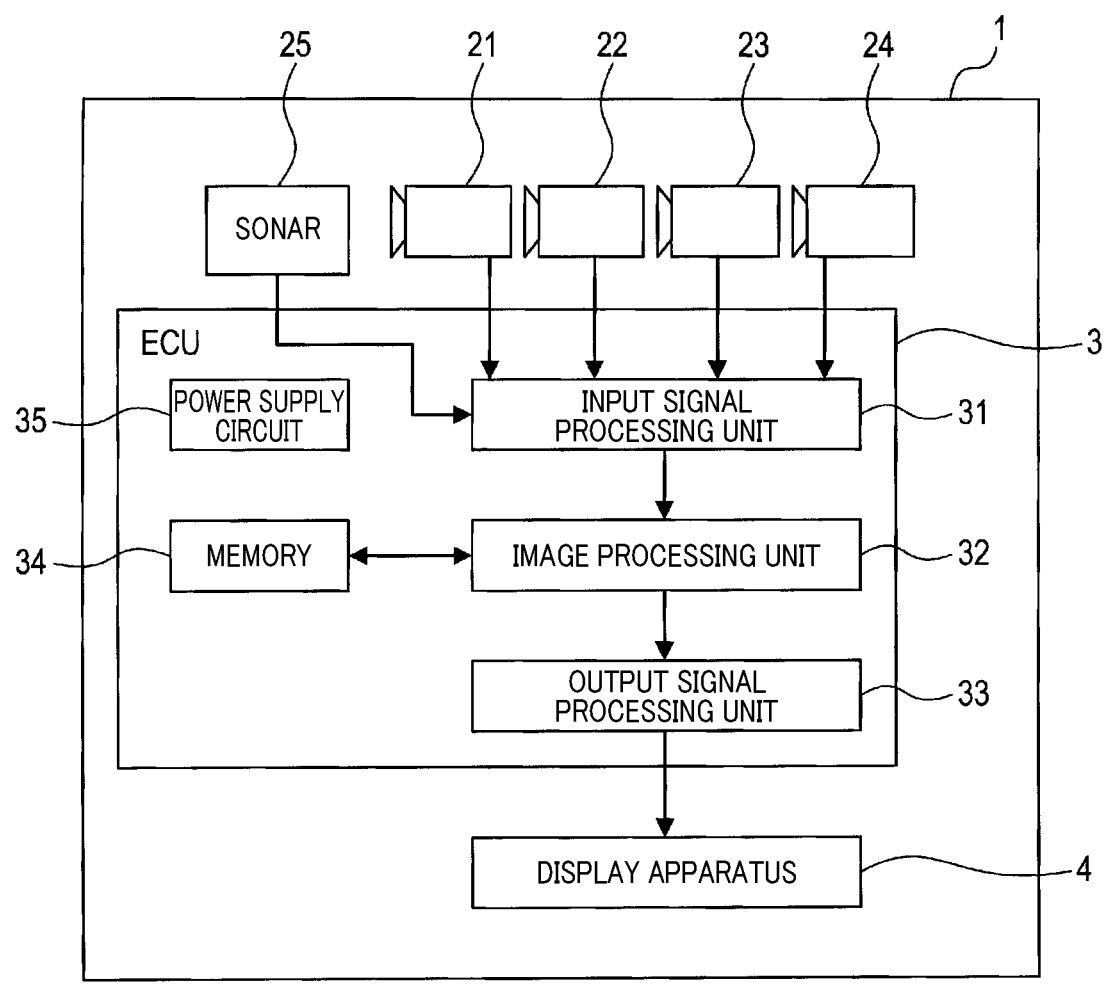
FIG. 1 is a block diagram of a configuration of a periphery monitoring system.

A periphery monitoring system 1 shown in FIG. 1 is mounted in a vehicle and includes a front camera 21, a rear camera 22, a left-side camera 23, a right-side camera 24, a sonar 25, an electronic control unit (ECU) 3, and a display apparatus 4. Hereafter, the vehicle in which the periphery monitoring system 1 is mounted is referred to as an "own vehicle."

Figure 2:
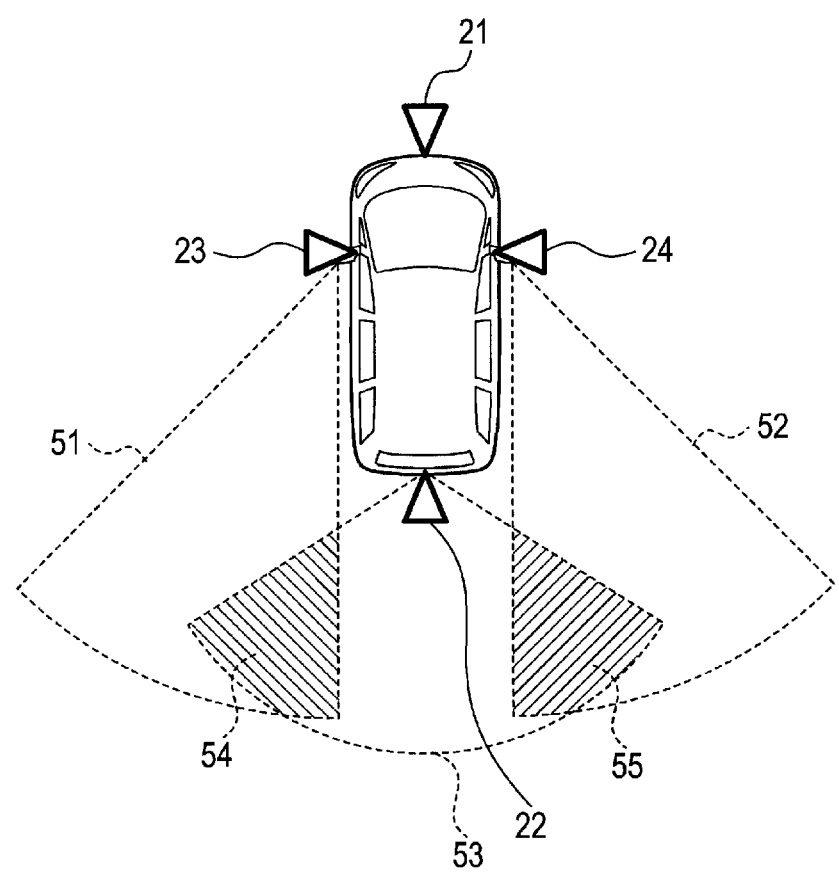
FIG. 2 is a diagram of a setup position of each camera, and imaging areas and overlapping areas of partial captured images in a rear display function.

The front camera 21, the rear camera 22, the left-side camera 23, and the right-side camera 24 output signals that express captured images to the ECU 3. As shown in FIG. 2, the cameras 21 to 24 are provided in a plurality of differing positions in the own vehicle. Specifically, the front camera 21 is provided in a front portion of the own vehicle. The rear camera 22 is provided in a rear portion of the own vehicle. The left-side camera 23 is provided in a left-side portion of the own vehicle. The right-side camera 24 is provided in a right-side portion of the own vehicle.

The cameras 21 to 24 are provided such that portions of areas that can be imaged overlap each other in each of the front area and the rear area of the own vehicle. Specifically, each of the cameras 21 to 24 is a wide-angle camera that is capable of imaging at an angle-of-view of about 180 degrees. Therefore, the areas that can be imaged by the left-side camera 23 and the right-side camera 24 partially overlap with the area that can be imaged by the front camera 21 on the front side of the own vehicle, and partially overlap with the area that can be imaged by the rear camera 22 on the rear side of the own vehicle.

According to the present embodiment, the rear camera 22, the left-side camera 23, and the right-side camera 24 are used to implement a rear display function in which a captured image that captures an area to the rear of the own vehicle is displayed in the display apparatus 4. In addition, the front camera 21, the left-side camera 23, and the right-side camera 24 are used to implement a front display function in which a captured image that captures an area ahead of the own vehicle is displayed in the display apparatus 4.

In the description below, a captured image that corresponds to the area that can be imaged by each of the cameras 21 to 24 is referred to as an "original captured image." A captured image that is displayed in the display apparatus 4, that is, a captured image that is a portion of the original captured image, is referred to as a "partial captured image."

FIG. 2 shows imaging areas that are areas that correspond to the partial captured images displayed in the rear display function, among the areas that can be respectively imaged by the rear camera 22, the left-side camera 23, and the right-side camera 24. A portion on the left side in an imaging area 53 of the rear camera 22 and a portion on the rear side in an imaging area 51 of the left-side camera 23 overlap in an overlapping area 54. In addition, portion on the right side in the imaging area 53 of the rear camera 22 and a portion on the rear side in an imaging area 52 of the right-side camera 24 overlap in an overlapping area 55.

Regarding the front display function, in a similar manner, a portion on the left side and a portion on the right side in the imaging area of the front camera 21 respectively overlap with a portion on the front side in the imaging area of the left-side camera 23 and a portion on the front side in the imaging area of the right-side camera 24.

Returning to FIG. 1, the sonar 25 is an ultrasonic sensor for detecting an object that is present in the periphery of the own vehicle. Specifically, a plurality of sonars 25 are provided in the own vehicle to enable detection of objects in the imaging areas that correspond to the partial captured images displayed in each of the rear display function and the front display function. The sonar 25 outputs detection results to the ECU 3.

The ECU 3 includes an input signal processing unit 31, an image processing unit 32, an output signal processing unit 33, a memory 34, and a power supply circuit 35. ECU is an acronym for electronic control unit.

The input signal processing unit 31 is an interface for outputting, to the image processing unit 32, each of the signals expressing the partial captured images inputted from the cameras 21 to 24.

The image processing unit 32 is mainly configured by a known microcomputer that includes a central processing unit (CPU), a random access memory (RAM), a read-only memory (ROM), and the like (not shown). The image processing unit 32 runs a program stored in a memory 34 that is a non-transitory computer readable storage medium. As a result of the program being run, a method corresponding to the program is performed. Specifically, the image processing unit 32 performs a target object detection process shown in FIG. 5, described hereafter, based on the program. The image processing unit 32 outputs a signal that expresses a display image for display in the display apparatus 4 to the output signal processing unit 33.

The output signal processing unit 33 is an interface for outputting the signal expressing the display image inputted by the image processing unit 32 to the display apparatus 4.

The memory 34 is a recording medium for recording the above-described program, the partial captured images, and the like.

The power supply circuit 35 converts a voltage that is inputted from a battery (not shown) to a predetermined voltage, and supplies the voltage to each part of the ECU 3.

Figure 3:
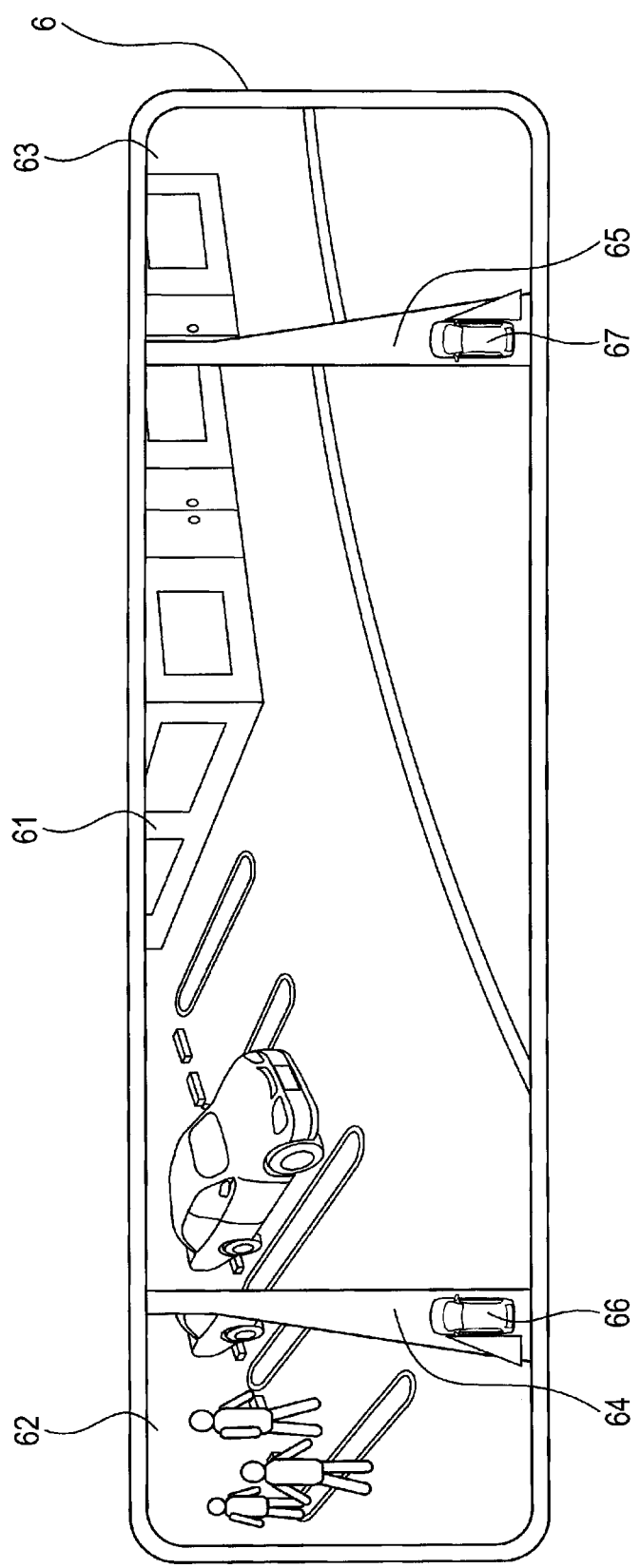
FIG. 3 is a diagram of a display image that is displayed at a default display ratio.

The display apparatus 4 is a display for displaying images and is provided in a position in which a driver of the own vehicle and the like can view the displayed image. As shown in FIG. 3, the display apparatus 4 according to the present embodiment is a rearview mirror in which a liquid crystal display is provided on an inner side of a half mirror. The display apparatus 4 is configured to be capable of switching between mirror mode that functions as a typical mirror and display mode in which the mirror portion functions as a single display screen 6, as result of the driver operating a dedicated button.

The display screen 6 has a substantially rectangular shape that is elongated in a lateral direction. In each of the rear display function and the front display function, three partial captured images are displayed side by side on the display screen 6. FIG. 3 is an example of the display image in the rear display function. A partial captured image 62 captured by the left-side camera 23, a partial captured image 61 by the rear camera 22, and a partial captured image 63 by the right-side camera 24 are displayed in order from the left when viewed by the driver. In the front display function, the partial captured image by the left-side camera 23, the partial captured image by the front camera 21, and the partial captured image by the right-side camera 24 are displayed in order from the left when viewed by the driver.

The rear display function and the front display function are switched by a shift lever in the above-described display mode. Specifically, the rear display function is a function that is used in a state in which a shift position is reverse. The front display function is a function that is used in a state in which the shift position is drive.

As shown in FIG. 3, the partial captured image 61 and the partial captured image 62 are divided into left and right on the display screen 6 by a separating portion 64 that is a band-shaped image that extends in an up/down direction, and are arranged to be separated from each other. In a similar manner, the partial captured image 61 and the partial captured image 63 are divided into left and right on the display screen 6 by a separating portion 65, in a manner similar to the separating portion 64, and are arranged to be separated from each other. Specifically, the separating portions 64 and 65 are shaped to widen downwards.

In lower portions of the separating portions 64 and 65, icons 66 and 67 that indicate the imaging area are displayed such that the driver can easily recognize of which of the left-side camera 23 and the right-side camera 24, the partial captured images 62 and 63 on both left and right sides on the display screen 6 are the partial captured images. Specifically, the icon 66 that indicates the left-side imaging area 51 of the own vehicle is displayed in the separating portion 64. The icon 67 that indicates the right-side imaging area 52 of the own vehicle is displayed in the separating portion 65. For example, the separating portions 64 and 65 are displayed such that portions excluding the icons 66 and 67 are blackcolored images, to facilitate ascertainment of the divisions between the partial captured images 61, 62, and 63.

2. Processes

Next, the target object detection process performed by the image processing unit 32 will be described with reference to the flowchart in FIG. 4. The target object detection process is a process that implements the rear display function and is periodically performed while the mode of the display apparatus 4 is display mode and the shift position of the shift lever is reverse.

At step S11, the image processing unit 32 acquires the signals expressing the original captured images of the rear camera 22, the left-side camera 23, and the right-side camera 24 and the detection results by the sonar 25, via the input signal processing unit 31.

At step S12, the image processing unit 32 determines whether a target object that is a predetermined object to be detected is present in each of the partial captured images that are portions of the original captured images expressed by the signals acquired by the rear camera 22, the left-side camera 23, and the right-side camera 24, also using the detection results by the sonar 25. Specifically, as described above, in each of the rear camera 22, the left-side camera 23, and the right-side camera 24, a captured image that expressed a portion of an area that can be imaged is displayed on the display screen 6 as the partial captured image. The above-described target object according to the present embodiment is a moving body, such as a person or a vehicle.

The moving body is detected by an image analysis process being performed on the partial captured images. Specifically, the moving body is detected by a movement vector being calculated using a known optical flow method from the partial captured images that are continuous in terms of time series. In addition, a moving body that cannot be detected by the optical flow method, such as a moving body is that positioned directly in front of the rear camera 22, the left-side camera 23, and the right-side camera 24 and is approaching the own vehicle, or a moving body that is stationary, is detected from the partial captured images using a known pattern matching method.

Furthermore, according to the present embodiment, it is determined whether the moving body that is detected by the image analysis process on the partial captured images is actually present in the detected position, based on the detection results by the sonar 25. As a result, a moving body that is determined to be actually present is determined to be the target object.

When determined that no target object is present at step S12, the image processing unit 32 advances the process to step S13. Then, the image processing unit 32 determines a display ratio that is a ratio of display areas of the partial captured images of the rear camera 22, the left-side camera 23, and the right-side camera 24 on the display screen 6 to be a default display ratio, and advances the process to step S15. According to the present embodiment, as shown in FIG. 3, the default display ratio is set to a ratio at which the respective display areas of the partial captured image 62, the partial captured image 61, and the partial captured image 63 are 1:3:1 in the lateral direction.

Meanwhile, when determined that a target object is present at step S12, described above, the image processing unit 32 advances the process to step S14. Then, the image processing unit 32 determines the display ratio of the partial captured images of the rear camera 22, the left-side camera 23, and the right-side camera 24 on the display screen 6 to be a display ratio for displaying such that the partial captured image in which the target object is determined to be present is enlarged and the partial captured image in which no target object is determined to be present is reduced, and advances the process to step S15.

Figure 5:
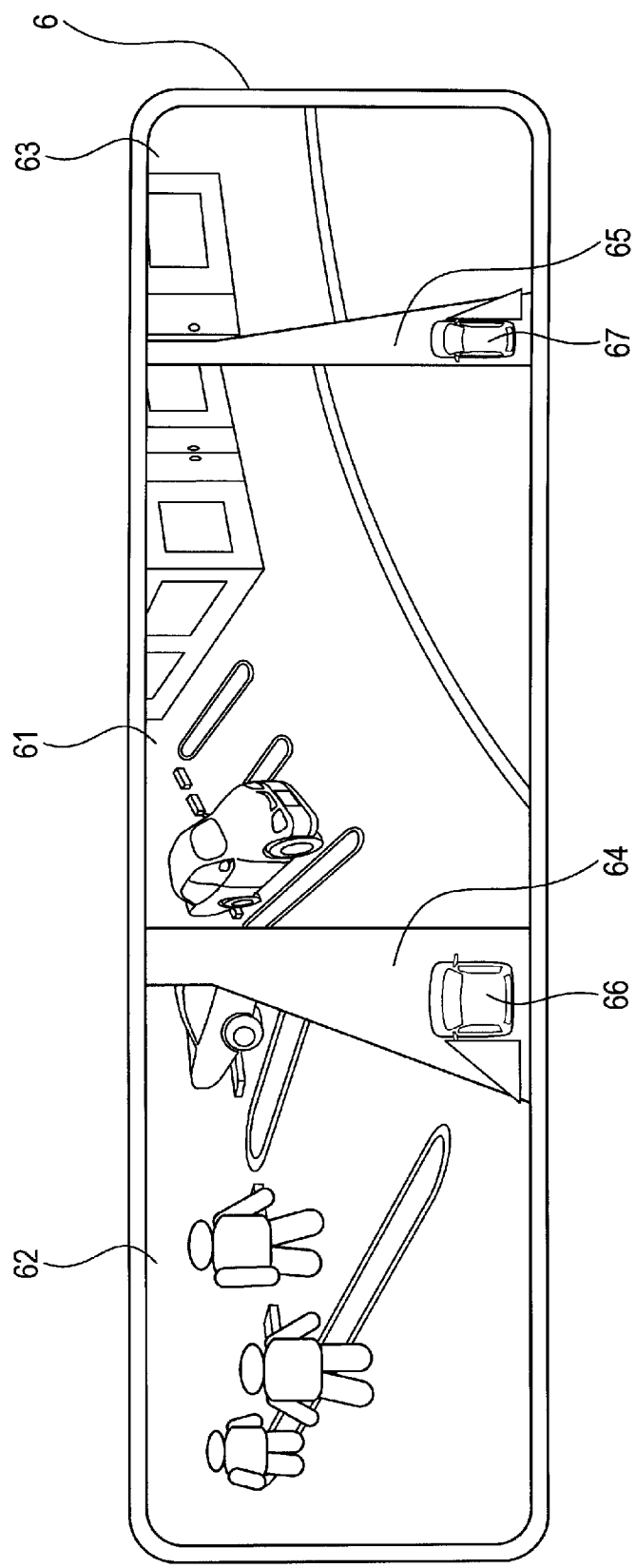
FIG. 5 is a diagram of a display image that is displayed at a display ratio during enlargement.

Specifically, when the target object is determined to be present in only the partial captured image 62 at above-described step S12, as shown in FIG. 5, the display ratio is determined to be a display ratio in which the display areas of the partial captured image 62, the partial captured image 61, and the partial captured image 63 are 2:2:1 in the lateral direction. Conversely, when the target object is determined to be present in only the partial captured image 63, the display ratio is determined to be a display ratio in which the display areas of the partial captured image 62, the partial captured image 61, and the partial captured image 63 are 1:2:2 in the lateral direction.

Meanwhile, when the target object is determined to be present in only the partial captured image 61, the display ratio is determined to be a display ratio in which the display areas of the partial captured image 62, the partial captured image 61, and the partial captured image 63 are 1:3:1 in the lateral direction, that is, the same display ratio as the default display ratio. The partial captured image 61 is not enlarged because the display area of the partial captured image 61 is wider compared to the other partial captured images 62 and 63, even at the default display ratio. However, not changing the display ratio is merely an example. The display ratio may be changed such that the partial captured image 61 is enlarged.

Here, when the target object is present in the overlapping area 54 or 55, the target object is present in two partial captured images. Specifically, when the target object is present in the overlapping area 54, the target object is determined to be present in both the partial captured image 62 and the partial captured image 61 at above-described step S12. In this case, the display ratio is determined to be a display ratio in which the display areas of the partial captured image 62, the partial captured image 61, and the partial captured image 63 are 2:2:1 in the lateral direction. In a similar manner, when the target object is present in the overlapping area 55, the target object is determined to be present in both the partial captured image 61 and the partial captured image 63 at above-described step S12. In this case, the display ratio is determined to be a display ratio in which the display areas of the partial captured image 62, the partial captured image 61, and the partial captured image 63 are 1:2:2 in the lateral direction.

Meanwhile, when a plurality of target objects are present in the periphery of the own vehicle, even when no target object is present in the overlapping areas 54 and 55, a target object may be present in a plurality of partial captured images. Specifically, when the target object is determined to be present in both the partial captured image 62 and the partial captured image 63 at above-described step S12, the display ratio is determined to be a display ratio in which the display areas of the partial captured image 62, the partial captured image 61, and the partial captured image 63 are 2:1:2 in the lateral direction.

In addition, when the target object is determined to be present in all partial captured images 61 to 63 at above-described step S12, the display ratio is determined to be a display ratio in which the display areas of the partial captured image 62, the partial captured image 61, and the partial captured image 63 are 1:3:1 in the lateral direction. In all of the examples, the ratios of the display areas in a vertical direction of the partial captured images 61 to 63 are all the same and do not change. In addition, the imaging areas of the partial captured images 61 to 63 are the same regardless of the display ratio.

As described above, as a result of the image processing unit 32 changing the display ratio in the lateral direction of the display areas of the partial captured images 61 to 63 in the display image, while maintaining the image areas of the partial captured images 61 to 63 on the display screen, the partial captured image in which a target object is determined to be present is enlarged and the partial captured image in which no target object is determined to present is reduced.

At step S15, the image processing unit 32 displays the display image on the display screen 6 at the display ratio determined at step S13 or S14. Specifically, when the determined display ratio differs from a previous display ratio, the image processing unit 32 displays the display image on the display screen 6 using a known morphing method that changes the display ratio in stages. For example, when the previous display ratio is 1:3:1 and the current display ratio is 2:2:1, rather than the display ratio being instantaneously changed, a lateral width of the partial captured image 62 is gradually increased and a lateral width of the partial captured image 61 is gradually decreased. Subsequently, the image processing unit 32 ends the target object detection process.

Figure 4:
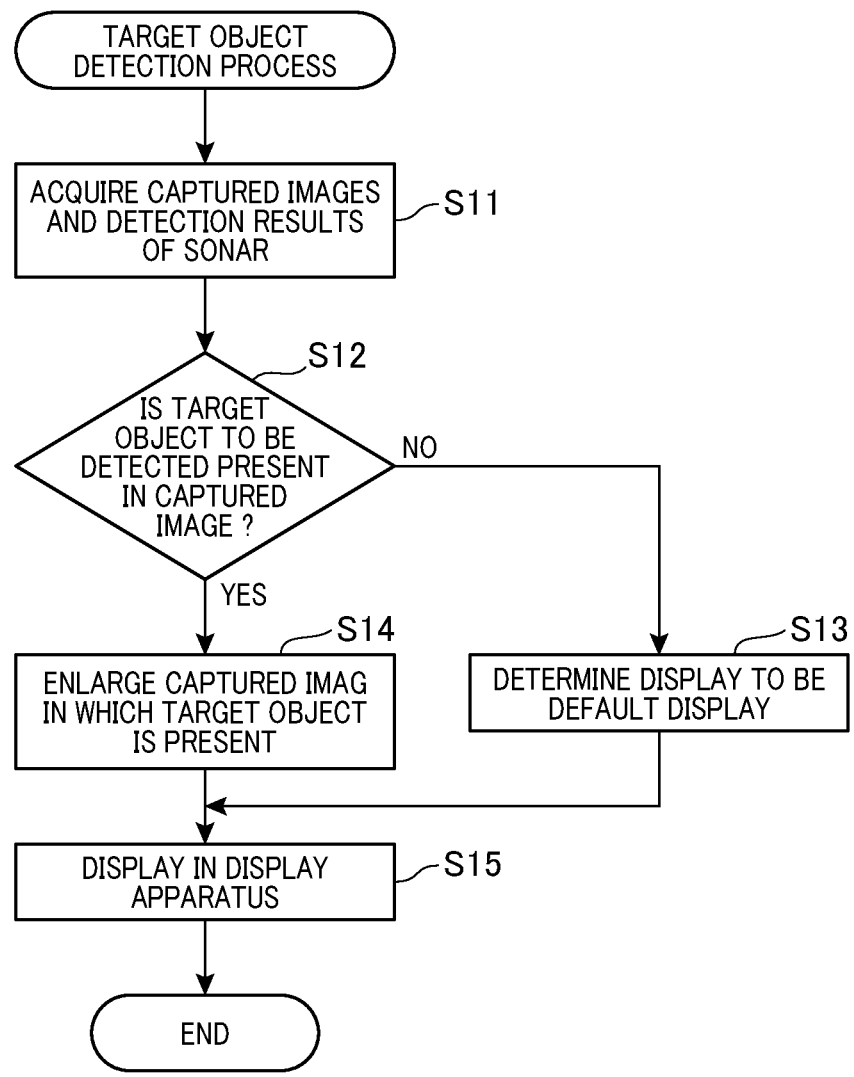
FIG. 4 is a flowchart of a target object detection process.

Here, while the mode of the display apparatus 4 is display mode and the shift position of the shift lever is drive, a process that is a process for actualizing the front display function and is similar to the target object detection process shown in FIG. 4 is periodically performed.

3. Effects

According to the embodiment described in detail above, the following effects are achieved.

(3a) According to the present embodiment, the three partial captured images 61 to 63 are each displayed in the display apparatus 4 such that the overlapping portions that correspond to the overlapping areas 54 and 55 remain. Therefore, even when an object that has height is present in the overlapping portion of the partial captured images 61 to 63, it becomes more difficult for portions of the object to disappear from the display screen 6. As a result, difficulty experienced by the driver in viewing an object on the display screen 6 can be suppressed.

In addition, the partial captured image in which a target object is determined to be present is displayed in an enlarged manner. Therefore, reduction in size of the target object displayed on the display screen 6 does not easily occur. As a result, a situation where the driver does easily notice the target object on the display screen 6 can be suppressed. Consequently, difficulty experienced by the driver in viewing a target object in the own vehicle periphery on the display screen 6 can be suppressed.

(3b) According to the present embodiment, the image processing unit 32 enlarges the partial captured image in which a target object is determined to be present and reduces the partial captured image in which no target object is determined to be present, compared to the default display ratio, by changing the display ratio of the partial captured images 61 to 63 on the single display screen 6 of the display apparatus 6. That is, the image processing unit 32 enlarges the partial captured image in which a target object is determined to be present and reduces the partial captured image in which no target object is determined to be present, compared to the display ratio when no target object is determined to be present in any of the partial captured images 61 to 63.

As a result, compared to a case in which the partial captured image in which a target object is determined to be present is enlarged without the partial captured image in which no target object is determined to be present being reduced, the display screen 6 can be more effectively used. That is, when the partial captured image in which a target object is determined to be present is enlarged without the partial captured image in which no target object is determined to be present being reduced, a margin for enlargement of the partial captured image in which a target object is determined to be present is required to be provided in the default display image in advance.

In contrast, according to the present embodiment, because the partial captured image in which no target object is determined to be present is reduced, the default display image and the display image during enlargement can both effectively use the overall display screen 6.

(3c) According to the present embodiment, the image processing unit 32 changes the display ratio of the partial captured images while maintain the imaging area on the display screen 6 of the partial captured image in which a target object is detected in the target object detection process, and thereby displays the partial captured image in an enlarged manner. As a result, unlike a case in which only a partial area including a target object in the partial captured image is enlarged and displayed, that is, when the imaging area is reduced by zoom-in, the driver can more easily recognize the target object on the display screen 6. That is, because enlargement is performed while maintaining the imaging area, the target object can be more easily recognized in the enlarged partial captured image while ascertaining the overall image of the partial captured image in which the target object is determined to be present.

(3d) According to the present embodiment, the image processing unit 32 displays the partial captured images 61 to 63 on the display screen 6 so as to be separated from each other. As a result, because the partial captured images 61 to 63 by the cameras 21 to 24 are displayed in a divided manner, of which camera the displayed partial captured images 61 to 63 are the partial captured images can be more easily recognized.

(3e) According to the present embodiment, the separating portions 64 and 65 are shaped to widen downwards. Therefore, intuitive ascertainment of perspective in the partial captured images 61 to 63 by the driver can be facilitated.

(3f) According to the present embodiment, the icons 66 and 67 that indicate the image areas 51 and 52 are displayed in the separating portions 64 and 65. As a result, of which of the left-side camera 23 and the right-side camera 24 the partial captured images 62 and 63 on both left and right sides on the display screen are the partial captured images can be more easily recognized by the driver.

(3g) According to the present embodiment, the cameras 21 to 24 and the sonar 25 are used together when the target object is detected. Therefore, compared to a configuration in which the target object is detected using only the cameras 21 to 24, detection accuracy regarding whether a predetermined target object to be detected is present in the partial captured images displayed on the display screen 6, among the original captured images expressed by the signals acquired by the cameras 21 to 24, can be improved.

According to the present embodiment, the image processing unit 32 corresponds to a periphery monitoring apparatus. Steps S13 to S15 correspond to a process of a display processing unit. Step S12 corresponds to a process as a determining unit. Step S14 corresponds to a process as an enlargement processing unit.

4. Other Embodiments

An embodiment of the present disclosure is described above. However, the present embodiment is not limited to the above-described embodiment and can be carried out with various modifications.

(4a) According to the above-described embodiment, a moving body such as a person or a vehicle is given as an example of the predetermined target object to be detected. However, the target object is not limited thereto. For example, the target object may include a stationary object such as a utility pole.

(4b) According to the above-described embodiment, the default display ratio of the display screen 6 is 1:3:1 in order from the left when viewed by the driver. However, the default display ratio is not limited thereto. For example, the default display ratio may be 1:1:1 or 1:2:1. In addition, the display ratios other than the default display ratio are not limited to the display ratios described according to the above-described embodiment.

(4c) According to the above-described embodiment, a configuration in which the image processing unit 32 reduces the display area of the partial captured image in which no target object is determined to be present instead of enlarging the display area of the partial captured image in which a target object is determined to be present in the target object detection process is given as an example. However, the display aspect of the partial captured image in which no target object is determined to be present is not limited thereto.

For example, only the display area of the partial captured image in which a target object is determined to be present may be enlarged without the display area of the partial captured image in which no target object is determined to be present being reduced. For example, such a display aspect can be implemented by a margin for enlargement of the partial captured image in which a target object is determined to be present being provided in the default display image in advance.

(4d) According to the above-described embodiment, a configuration in which the display area of the partial captured image in which a target object is determined to be present is enlarged by the display ratio in the lateral direction of the display areas of the partial captured images 61 to 63 in the display image being changed is given as an example. However, the manner in which the display ratio is changed is not limited thereto.

For example, the display ratios in both the lateral direction and the vertical direction of the display areas of the partial captured images may be changed. Specifically, for example, the display area of the partial captured image in which a target object is determined to be present may be enlarged and the display area of the partial captured image in which no target object is determined to be present may be reduced while maintaining the aspect ratio of the display areas of the partial captured images.

For example, such a display aspect can also be implemented by a margin for enlargement of the partial captured image in which a target object is determined to be present being provided in the default display image in advance. In addition, only the display ratio in the vertical direction of the display areas of the partial captured images may be changed. For example, when the plurality of partial captured images are arranged in a line in the vertical direction on the display screen, in a manner similar to the above-described embodiment, the display ratio can be changed without a margin being provided in the display image.

(4e) According to the above-described embodiment, a configuration in which the imaging area is maintained even when the display area is enlarged or reduced is given as an example. However, the present disclosure is not limited thereto. The imaging area of the partial captured image may be changed. For example, the imaging area may be reduced by only a partial area including the target object in the partial captured image being enlarged and displayed, that is, by zoom-in being performed.

(4f) According to the above-described embodiment, the display apparatus 4 is configured such that mirror mode and display mode can be switched by a dedicated button being operated. However, the method for switching the mode of the display apparatus 4 is not limited thereto. For example, mirror mode may be automatically switched to display mode when transition to a specific state is made, such as a state in which the shift position is reverse or a state in which a traveling speed of the own vehicle is equal to or less than a threshold. In addition, the display apparatus 4 may function as display mode at all times in a manner similar to a so-called electronic mirror.

(4g) According to the above-described embodiment, the separating portions 64 and 65 are shaped to widen downwards, such that intuitive ascertainment of perspective in the partial captured images 61 to 63 by the driver can be facilitated. However, the shape of the separating portion is not limited thereto. For example, the separating portion may have a fixed width.

(4h) According to the above-described embodiment, the icons 66 and 67 are displayed in the lower portions of the separating portions 64 and 65. However, the display positions of the icons are not limited thereto. For example, the icon may be displayed in a location other than the lower portion of the separating portion, such as an upper portion of the separating portion or a location other than the separating portion. In addition, the icon may not be displayed.

(4i) According to the above-described embodiment, the partial captured images are displayed to be divided into left and right by the separating portions 64 and 65 in the display image. However, display of the display image is not limited thereto. For example, the partial captured images may not be divided by the separating portions.

(4j) According to the above-described embodiment, when the determined display ratio differs from the previous display ratio, the morphing method in which the display ratio is changed in stages is used. However, the method for changing the display ratio is not limited thereto. For example, the display ratio may be instantaneously changed.

(4k) According to the above-described embodiment, a rearview mirror in which a liquid crystal display is provided on the inner side of a half mirror is given as an example of the display apparatus. However, the display apparatus is not limited thereto. For example, the display apparatus may be a navigation apparatus or a display other than the navigation apparatus that is mounted in the own vehicle.

(4l) According to the above-described embodiment, the cameras 21 to 24 and the sonar 25 are used to detect the predetermined target object in the periphery of the own vehicle. However, the apparatuses used to detect the target object are not limited thereto. For example, instead of the sonar 25, a millimeter wave radar, a laser radar, or the like may be used together with the cameras 21 to 24. In addition, for example, the target object may be detected by only the cameras 21 to 24.

(4m) According to the above-described embodiment, the target object detection process performs the processes to implement the front display function and the rear display function based on the shift position of the shift lever when the mode of the display apparatus 4 is display mode. However, the target object detection process is not limited thereto. For example, the target object detection process may perform the process to implement only the rear display function.

(4n) According to the above-described embodiment, the periphery of the vehicle is imaged by four cameras 21 to 24. However, the number of cameras is not limited thereto. For example, the number of cameras may be other than four. In this case, for example, the number of cameras may be three cameras, that is, the front camera 21, the left-side camera 23, and the right-side camera 24 that capture the front area, or three cameras, that is, the rear camera 22, the left-side camera 23, and the right-side camera 24 that capture the rear area.

(4o) According to the above-described embodiment, a part or all of the functions provided by the image processing unit 32 may be configured by hardware, such as a single integrated circuit (IC) or a plurality thereof.

(4p) The present disclosure can also be implemented by various modes in addition to the above-described image processing unit 32, such as the periphery monitoring system 1 of which the image processing unit 32 is a constituent element, a program enabling a computer to function as the image processing unit 32, a non-transitory, tangible recording medium such as a semiconductor memory on which the program is recorded, and a method for enlarging a partial captured image when a target object is determined to be present.

(4q) A plurality of functions provided by a single constituent element according to the above-described embodiments may be implemented by a plurality of constituent elements. A single function provided by a single constituent element may be implemented by a plurality of constituent elements. In addition, a plurality of functions provided by a plurality of constituent elements may be implemented by a single constituent element. A single function provided by a plurality of constituent elements may be implemented by a single constituent element.

Furthermore, a part of a configuration according to the above-described embodiments may be omitted. Moreover, at least a part of a configuration according to an above-described embodiment may be added to or replace a configuration according to another of the above-described embodiments. Any mode included in the technical concept specified by the wordings of the scope of claims is an embodiment of the present disclosure.

The invention claimed is:

1. A periphery monitoring apparatus comprising:
a processor, wherein the processor is configured to:
display, in a display apparatus that is provided in a vehicle, a plurality of captured images that are acquired by a plurality of cameras provided in a plurality of differing positions of the vehicle and have overlapping portions in which portions of imaging areas overlap each other, such that the overlapping portions remain;
determine whether a predetermined target object to be detected is present in each of the plurality of captured images; and
enlarge, in response to the processor determining that the predetermined target object is present in at least one of the plurality of captured images, a captured image in which the predetermined target object is determined to be present, among the plurality of captured images, and display the captured image in the display apparatus, wherein
the processor is further configured to:
display the plurality of captured images on a single display screen of the display apparatus;
change a ratio of display areas of the plurality of captured images on the display screen;
enlarge and display the display area on the display screen of at least one captured image in which the predetermined target object is determined to be present, compared to when determining that no predetermined target object is present in any of the plurality of captured images; and
reduce and display the display area on the display screen of at least one captured image in which no predetermined target object is determined to be present.

2. The periphery monitoring apparatus according to claim 1, wherein:
the processor is further configured to
change the ratio of the display areas on the display screen while maintaining the imaging areas of the plurality of captured images displayed on the display screen.

3. The periphery monitoring apparatus according to claim 1, wherein:
the processor is further configured to
display the plurality of captured images so as to be separated from each other on the display screen.

4. The periphery monitoring apparatus according to claim 2, wherein:
the processor is further configured to
display the plurality of captured images so as to be separated from each other on the display screen.

5. A periphery monitoring apparatus comprising:
a processor, wherein the processor is configured to:
display, in a display apparatus that is provided in a vehicle, a plurality of captured images that are acquired by a plurality of cameras provided in a plurality of differing positions of the vehicle and have overlapping portions in which portions of imaging areas overlap each other, such that the overlapping portions remain;
determine whether a predetermined target object to be detected is present in each of the plurality of captured images; and
enlarge, in response to the processor determining that the predetermined target object is present in at least one of the plurality of captured images, a captured image in which the predetermined target object is determined to be present, among the plurality of captured images, and display the captured image in the display apparatus, wherein
the processor is further configured to
enlarge and display the captured image while maintaining the imaging areas of the plurality of captured images displayed on a display screen.

6. The periphery monitoring apparatus according to claim 5, wherein:
the processor is further configured to
display the plurality of captured images on a single display screen of the display apparatus.

7. The periphery monitoring apparatus according to claim 5, wherein:

the processor is further configured to
display the plurality of captured images so as to be separated from each other on the display screen.

\* \* \* \* \*